US012566363B2

(12) United States Patent
Ito et al.

(10) Patent No.: US 12,566,363 B2
(45) Date of Patent: Mar. 3, 2026

(54) SUPPORT FRAMES FOR A PROJECTOR

(71) Applicant: SEIKO EPSON CORPORATION, Tokyo (JP)

(72) Inventors: Masatoshi Ito, Matsumoto (JP); Tetsuya Tamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 438 days.

(21) Appl. No.: 18/172,625

(22) Filed: Feb. 22, 2023

(65) Prior Publication Data

US 2023/0266648 A1      Aug. 24, 2023

(30) Foreign Application Priority Data

Feb. 22, 2022    (JP) ................................. 2022-025379

(51) Int. Cl.
G03B 21/14          (2006.01)
G03B 21/20          (2006.01)

(52) U.S. Cl.
CPC ....... G03B 21/142 (2013.01); G03B 21/2046 (2013.01)

(58) Field of Classification Search
CPC ...... H04N 9/31; H04N 9/3102; H04N 9/3105; H04N 9/3141; H04N 9/3152; G03B 21/00; G03B 21/005; G03B 21/006; G03B 21/008; G03B 21/14; G03B 21/28; G03B 21/142; G03B 21/145; G03B 21/147; G03B 21/2053; G03B 21/2046; G03B 21/2066
See application file for complete search history.

(56) References Cited

U.S. PATENT DOCUMENTS

| | | | |
|---|---|---|---|
| 2013/0002971 A1* | 1/2013 | Kadotani | H04N 9/3141 |
| | | | 349/5 |
| 2013/0242210 A1* | 9/2013 | Endo | G03B 21/14 |
| | | | 349/8 |
| 2014/0211172 A1 | 7/2014 | Mori | |
| 2015/0268536 A1 | 9/2015 | Nagatani | |
| 2016/0227177 A1 | 8/2016 | Mizoguchi | |
| 2017/0017142 A1 | 1/2017 | Mori | |

(Continued)

FOREIGN PATENT DOCUMENTS

| | | |
|---|---|---|
| CN | 106054359 A | 10/2016 |
| JP | 2005031516 A | 2/2005 |

(Continued)

*Primary Examiner* — Sultan Chowdhury
(74) *Attorney, Agent, or Firm* — Dority & Manning, P.A.

(57)          ABSTRACT

A projector according to an aspect of the present disclosure includes a light source apparatus, an image generator, an optical path changer, and a projection optical apparatus. The image generator includes a light modulator that modulates the light emitted from the light source apparatus in accordance with image information to generate the image light, and a first holder that holds the light modulator. The optical path changer includes an optical part that the image light outputted from the image generator enters, an optical support section that pivotably supports the optical part, and a second holder that holds the optical support section. The projection optical apparatus includes a projection system that the light emitted from the optical path changer enters, and a third holder that holds the projection system. The first and second holders are fixed to the third holder.

14 Claims, 10 Drawing Sheets

(56)                    References Cited

U.S. PATENT DOCUMENTS

| | | | |
|---|---|---|---|
| 2018/0120680 A1 | 5/2018 | Mori | |
| 2019/0049824 A1* | 2/2019 | Yamamoto | G02B 5/3025 |
| 2019/0101811 A1* | 4/2019 | Tamura | G03B 21/147 |
| 2019/0346684 A1* | 11/2019 | Chou | G02B 27/0977 |
| 2020/0174246 A1* | 6/2020 | Wakabayashi | G03B 21/006 |
| 2021/0199932 A1 | 7/2021 | Chang et al. | |
| 2021/0247671 A1 | 8/2021 | Wakabayashi et al. | |

FOREIGN PATENT DOCUMENTS

| | | |
|---|---|---|
| JP | 2014-145995 A | 8/2014 |
| JP | 2015-179160 A | 10/2015 |
| JP | 2016-143989 A | 8/2016 |
| JP | 2017-167379 A | 9/2017 |
| JP | 2021124624 A | 8/2021 |

* cited by examiner

SUPPORT FRAMES FOR A PROJECTOR

The present application is based on, and claims priority from JP Application Serial Number 2022-025379, filed Feb. 22, 2022, the disclosure of which is hereby incorporated by reference herein in its entirety.

BACKGROUND

1. Technical Field

The present disclosure relates to a projector.

2. Related Art

There has been a projector in which the optical path of light modulated by an optical modulator is changed by an optical path changer to move the position where image light is projected (see JP A-2021-124624, for example). In the projector, a fixed base holds the optical path changer and a projection optical apparatus, and the light modulator is held at the fixed base via a prism base.

The projector described above, however, has a problem of an increase in the size of the apparatus configuration because the projector requires the fixed base for holding the projection optical apparatus, the optical path changer, and the light modulator.

SUMMARY

To solve the problem described above, according to an aspect of the present disclosure, there is provided a projector including a light source apparatus, an image generator that modulates light emitted from the light source apparatus to generate image light, an optical path changer that changes an optical path of the image light generated by the image generator, and a projection optical apparatus that projects the image light having an optical path changed by the optical path changer. The image generator includes a light modulator that modulates the light emitted from the light source apparatus in accordance with image information to generate the image light, and a first holder that holds the light modulator. The optical path changer includes an optical part that the image light outputted from the image generator enters, an optical support section that pivotably supports the optical part, and a second holder that holds the optical support section. The projection optical apparatus includes a projection system that the light emitted from the optical path changer enters, and a third holder that holds the projection system. The first and second holders are fixed to the third holder.

According to another aspect of the present disclosure, there is provided a projector including a light source apparatus, an image generator that modulates light from the light source apparatus to generate image light, an optical path changer that changes an optical path of the image light generated by the image generator, a projection optical apparatus that projects the image light having an optical path changed by the optical path changer, and a light guiding optical apparatus that guides the light outputted from the light source apparatus to a light modulator. The image generator includes the light modulator, which modulates the light from the light source apparatus in accordance with image information to generate the image light, and a first holder that holds the light modulator. The optical path changer includes an optical member that the image light outputted from the image generator enters, an optical support section that pivotably supports the optical member, and a second holder that holds the optical support section. The projection optical apparatus includes a projection system that the light from the optical path changer enters, and a third holder that holds the projection system. The light guiding optical apparatus includes a light guide system that the light outputted from the light source apparatus enters, and a fourth holder that holds the light guide system. The second and fourth holders are fixed to the third holder.

According to still another aspect of the present disclosure, there is provided a projector including a light source apparatus, an image generator that modulates light from the light source apparatus to generate image light, an optical path changer that changes an optical path of the image light generated by the image generator, a projection optical apparatus that projects the image light having an optical path changed by the optical path changer, and a light guiding optical apparatus that guides the light outputted from the light source apparatus to a light modulator. The image generator includes the light modulator, which modulates the light from the light source apparatus in accordance with image information to generate the image light, and a first holder that holds the light modulator. The optical path changer includes an optical member that the image light outputted from the image generator enters, an optical support section that pivotably supports the optical member, and a second holder that holds the optical support section. The projection optical apparatus includes a projection system that the light from the optical path changer enters, and a third holder that holds the projection system. The light guiding optical apparatus includes a light guide system that the light outputted from the light source apparatus enters, and a fourth holder that holds the light guide system. The first and fourth holders are fixed to the third holder.

BRIEF DESCRIPTION OF THE DRAWINGS

FIG. 1 is a schematic configuration diagram of a projector according to an embodiment.

FIG. 7 is a plan view of a light guiding optical apparatus.

FIG. 8 is a plan view showing key portions of a projection lens enclosure of a projection optical apparatus.

FIG. 10 is an exploded perspective view showing a fixation structure of the projection lens enclosure according to a variation.

DESCRIPTION OF EXEMPLARY EMBODIMENTS

Figure 2:
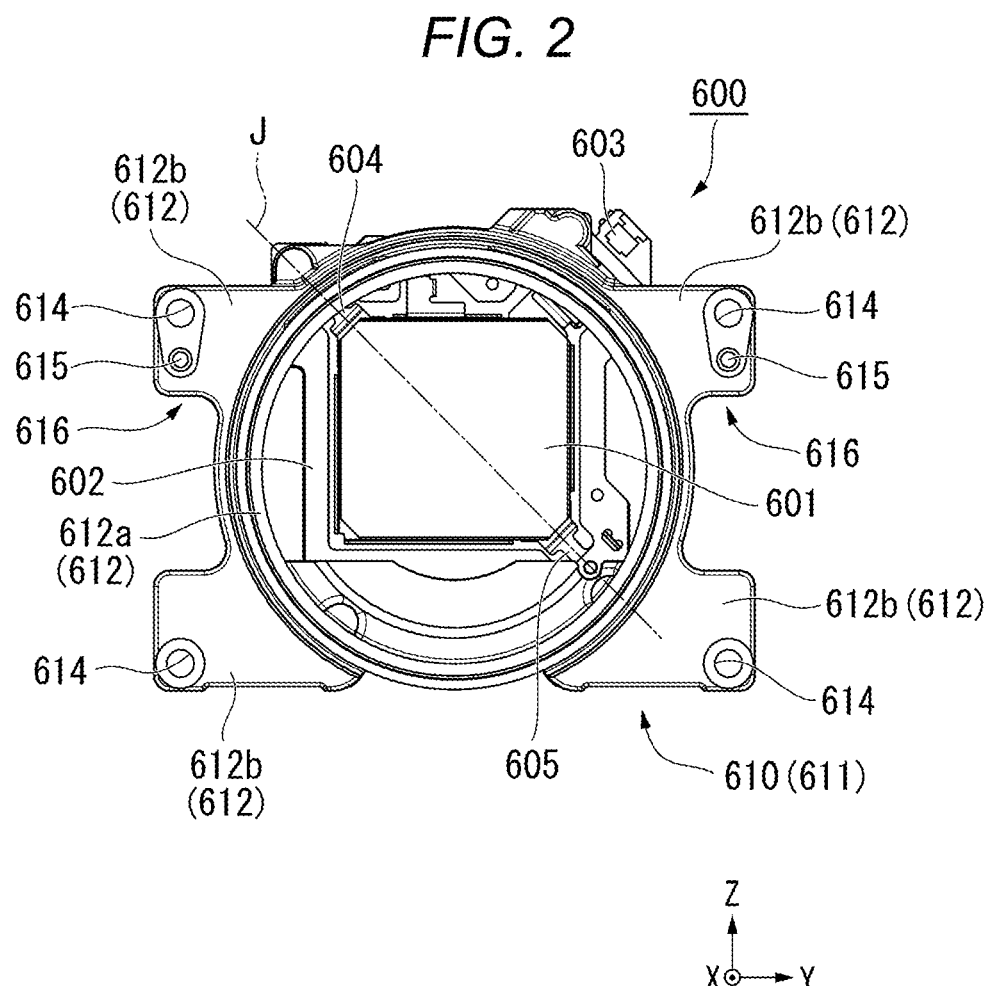
FIG. 2 shows the configuration of an optical path changer.

An embodiment of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

Figure 1:
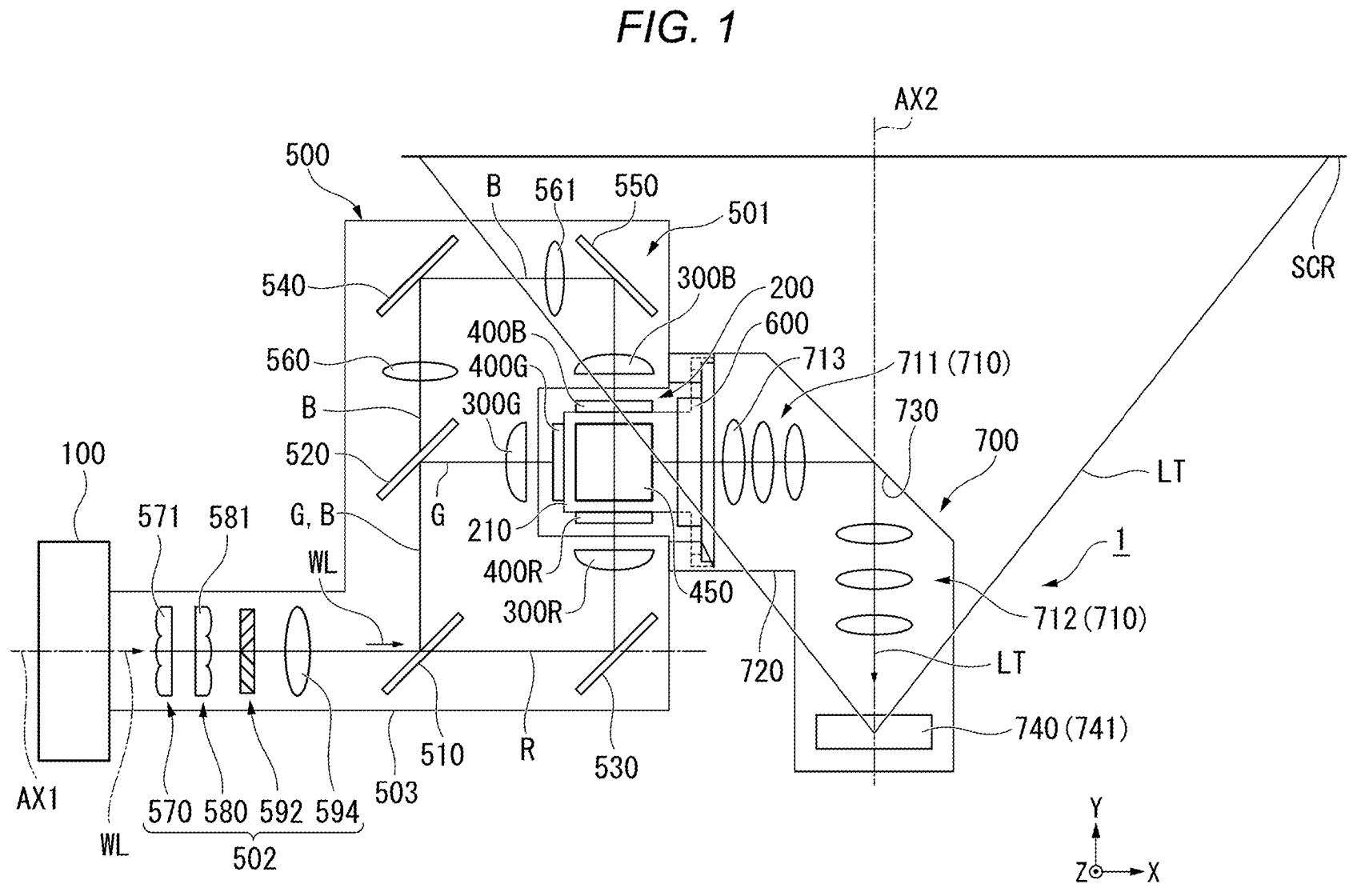

FIG. 1 is a schematic configuration diagram of a projector according to the present embodiment.

A projector 1 according to the present embodiment shown in FIG. 1 includes a light source apparatus 100, an image generator 200, a light guiding optical apparatus 500, an optical path changer 600, and a projection optical apparatus 700.

The light source apparatus 100 outputs white light WL toward the light guiding optical apparatus 500. The light source apparatus 100 includes a laser light source, a wavelength converter, and other components that are not shown. The light source apparatus 100 includes a focusing lens that focuses blue laser light outputted as excitation light from the laser light source, causes the focused excitation light to be incident on the wavelength converter containing a phosphor, and outputs the white light WL formed the blue laser light and yellow fluorescence.

In the following description, an XYZ coordinate system shown in the drawings is used to describe in some cases the arrangement of members of the projector 1. In the drawings, an axis X is an axis along an illumination optical axis AX1 of the white light WL outputted from the light source apparatus 100. An axis Y is an axis perpendicular to the axis X and extending along an optical axis AX2 of image light LT projected from the projector 1 toward a screen SCR. An axis Z is perpendicular to the axes X and Y.

In the present embodiment, for example, the direction along the axis Z is referred to as an "upward-downward direction Z" in the projector 1, +Z referred to as an "upper side", −Z referred to as a "lower side". The direction along the axis X is referred to as a "rightward-leftward direction X" in the projector 1, the side labeled with +X, where the projection optical apparatus 700 is provided in the projector 1, referred to as a "right side", the side labeled with −X, where the light source apparatus 100 is provided in the projector 1, referred to as a "left side". The direction along the axis Y is referred to as a "frontward-rearward direction Y" in projector 1, +Y referred to as a "front side", −Y referred to as a "rear side".

The upward-downward direction Z, the rightward-leftward direction X, and the frontward-rearward direction Y are merely names for describing the arrangement of the components of the projector 1, and do not specify the actual installation postures or directions of the components in the projector 1.

The light guiding optical apparatus 500 guides the white light WL outputted from the light source apparatus 100 to the image generator 200. The light guiding optical apparatus 500 includes a light guide system 501, a uniform illumination system 502, and a light guide optics enclosure (fourth holder) 503. The light guide system 501 and the uniform illumination system 502 are held by the light guide optics enclosure 503.

The light guide system 501 includes dichroic mirrors 510 and 520, reflection mirrors 530, 540, and 550, relay lenses 560 and 561, and field lenses 300R, 300G, and 300B.

The dichroic mirror 510 transmits a red light component and reflects a green light component and a blue light component. The dichroic mirror 520 reflects the green light component and transmits the blue light component. The reflection mirror 530 reflects the red light component. The blue light component having passed through the dichroic mirror 520 passes through the relay lens 560 and is incident on the reflection mirror 540. The blue light B reflected off the reflection mirror 540 passes through the relay lens 561, is incident on the reflection mirror 550, is reflected off the reflection mirror 550, and enters the image generator 200.

The light guide system 501 separates the white light WL outputted from the light source apparatus 100 into red light R, green light G, and blue light B, and guides the red light R, the green light G, and the blue light B to the image generator 200.

The uniform illumination system 502 of the light guiding optical apparatus 500 includes a first lens array 570, a second lens array 580, a polarization converter 592, and a superimposing lens 594.

The first lens array 570 includes a plurality of lenslets 571 for dividing the white light WL from the light source apparatus 100 into a plurality of sub-luminous fluxes. The plurality of lenslets 571 are arranged in a matrix in a plane perpendicular to the illumination optical axis AX1 of the light source apparatus 100. The second lens array 580 includes a plurality of lenslets 581 corresponding to the plurality of lenslets 571 of the first lens array 570. The second lens array 580 along with the superimposing lens 594 brings images of the lenslets 571 of the first lens array 570 into focus in the vicinity of an image formation region of each of the light modulators 400R, 400G, and 400B of the image generator 200, which will be described later. The plurality of lenslets 581 are arranged in a matrix in a plane perpendicular to the illumination optical axis AX1.

The polarization converter 592 converts the divided sub-luminous fluxes from the first lens array 570 into linearly polarized luminous fluxes. The polarization converter 592 includes polarization separation layers, reflection layers, and retardation films.

The polarization separation layers of the polarization converter 592 transmit one linearly polarized component of the polarized components contained in the white light WL outputted from the light source apparatus 100 and reflect another linearly polarized component in a direction perpendicular to the illumination optical axis AX1. The reflection layers of the polarization converter 592 reflect the other linearly polarized component reflected off the polarization separation layers in the direction parallel to the illumination optical axis AX1. The retardation films of the polarization converter 592 convert the other linearly polarized component reflected off the reflection layers into the one linearly polarized component.

The superimposing lens 594 focuses the sub-luminous fluxes from the polarization converter 592 and superimposes the focused sub-luminous fluxes on one another in the vicinity of the image formation region of each of the light modulators 400R, 400G, and 400B. Based on the configuration described above, the uniform illumination system 502 functions as an optical integration system that homogenizes in the image formation regions the in-plane light intensity distribution of the white light WL from the light source apparatus 100.

The image generator 200 includes a panel holder (first holder) 210, the light modulator 400R, 400G, and 400B, and a cross dichroic prism 450. The panel holder 210 holds the light modulators 400R, 400G, and 400B and the cross dichroic prism 450.

The light modulators 400R, 400G, and 400B are each formed of a liquid crystal panel that modulates the color light incident thereon in accordance with image information to form an image. The operation mode of the liquid crystal panels may be any of the TN mode, the VA mode, the horizontal field mode, or any other mode, and is not limited to a specific mode. The light modulators 400R, 400G, and 400B each include an incident-side polarizer (not shown) disposed at the light incident side and an exiting-side polarizer (not shown) disposed at the light exiting side.

The cross dichroic prism 450 combines the images outputted from the light modulators 400R, 400G, and 400B with one another to form full-color image light. The cross dichroic prism 450 is formed of four right-angled prisms bonded to each other and has a substantially square shape in the plan view. In the cross dichroic prism 450, dielectric multilayer films are formed at the substantially X-letter-shaped interfaces between the right-angled prisms bonded to each other.

The image light LT having exited out of the cross dichroic prism 450 enters the optical path changer 600. The optical path changer 600 changes the optical path of the image light LT generated by the image generator 200.

FIG. 2 shows the configuration of the optical path changer 600.

The optical path changer 600 includes a light transmissive substrate (optical member) 601, a support frame (optical support section) 602, a driver 603, a first shaft 604, a second shaft 605, and an enclosure (second holder) 610, which holds the support frame 602, as shown in FIG. 2. The optical path changer 600 will be described later in detail.

The image light LT having an optical path changed by the optical path changer 600 enters the projection optical apparatus 700. The projection optical apparatus 700 enlarges and projects a color image on the screen SCR.

The image light LT outputted from the image generator 200 enters the light transmissive substrate 601. The support frame 602 is a frame-shaped member that swingably supports an outer circumferential portion of the light transmissive substrate 601. The first shaft 604 and the second shaft 605 link the light transmissive substrate 601 and the support frame 602 to each other. The driver 603 swings the light transmissive substrate 601 around a swing axis J passing through the first shaft 604 and the second shaft 605. The swing axis J extends in the direction along the diagonal of the light transmissive substrate 601, which has a rectangular shape. The swing axis J passing through the first shaft 604 and the second shaft 605 is located in a plane substantially parallel to the plane YZ and inclines, for example, by 45° with respect to the axes Y and Z.

The light transmissive substrate 601 is not necessarily made of a specific material and can be made of any of a variety of glass materials, such as white sheet glass, borosilicate glass, and quartz glass. A glass plate is used as the light transmissive substrate 601 in the present embodiment, but the light transmissive substrate 601 only needs to be made of a material that transmits light and refracts the image light LT. That is, the light transmissive substrate 601 is not necessarily made of glass and may instead be made of any of a variety of crystal materials, such as quartz and sapphire, or any of a variety of resin materials, such as polycarbonate-based resin and acrylic resin.

The driver 603 is disposed at a portion farthest from the swing axis J among the components that constitute the optical path changer 600. The driver 603 is formed, for example, of an actuator including a permanent magnet and a coil facing each other.

In the optical path changer 600, when the light transmissive substrate 601 is located at a position where the image light LT is incident on the light transmissive substrate 601 at an angle of incidence of 0° (hereinafter referred to as "reference position"), the direction of a normal to the light transmissive substrate 601 coincides with the rightward-leftward direction X.

The image light LT is incident on the light transmissive substrate 601, for example, in the axis-X direction (rightward-leftward direction X). In this process, when the driver 603 swings the light transmissive substrate 601 around the swing axis J, the angle of incidence of the image light LT incident on the light transmissive substrate 601 changes. When the angle of incidence of the image light LT incident on the light transmissive substrate 601 changes from 0°, the light transmissive substrate 601 refracts and transmits the incident image light LT. Based on the configuration described above, the optical path changer 600 can change the posture of the light transmissive substrate 601 to adjust the angle of incidence of the image light LT incident on the light transmissive substrate 601 and therefore control the direction in which the optical path shifts and the amount of the shift.

The projection optical apparatus 700 includes a projection system 710, which the light from the optical path changer 600 enters, a projection lens enclosure (third holder) 720, a first reflection mirror 730, and a second reflection mirror 740, as shown in FIG. 1. The projection lens enclosure 720 holds the projection system 710, the first reflection mirror 730, and the second reflection mirror (reflective projection mirror) 740.

The projection system 710 includes a plurality of lenses. The projection system 710 in the present embodiment includes a first lens group 711 formed of a plurality of lenses, a second lens group 712 formed of a plurality of lenses, the first reflection mirror 730, and the second reflection mirror 740. The projection system 710 in the present embodiment employs a configuration in which the first reflection mirror 730 and the second reflection mirror 740 change the orientation of the optical axis in such a way that the orientation at the light incident side differs from that at the light exiting side, as will be described later.

The first lens group 711 causes the image light LT incident from the optical path changer 600 to exit toward the first reflection mirror 730. The first reflection mirror 730 reflects the image light LT rearward (−Y). The first reflection mirror 730 is formed, for example, of a planar mirror. The image light LT reflected off the first reflection mirror 730 enters the second lens group 712.

The second lens group 712 causes the image light LT incident from the first reflection mirror 730 to be incident on the second reflection mirror 740. The second reflection mirror 740 is formed of an aspherical mirror that reflects the image light LT while widening the image light LT. The second reflection mirror 740 has a reflection surface 741 formed in the shape of a free-form surface that is not rotationally symmetrical. The second reflection mirror 740 is so disposed that the reflection surface 741 faces frontward (+Y) and upward (+Z). Based on the configuration described above, the second reflection mirror 740 reflects the image light LT frontward (+Y) and upward (+Z) to project the image light LT onto the screen SCR.

The projection optical apparatus 700 in the present embodiment can enlarge and project the image light LT from a position relatively close to the screen SCR, which is a projection receiving surface. The projector 1 according to the present embodiment, which includes the projection optical apparatus 700, is therefore configured as a short-focal-length projector having a short focal length.

Figure 3:
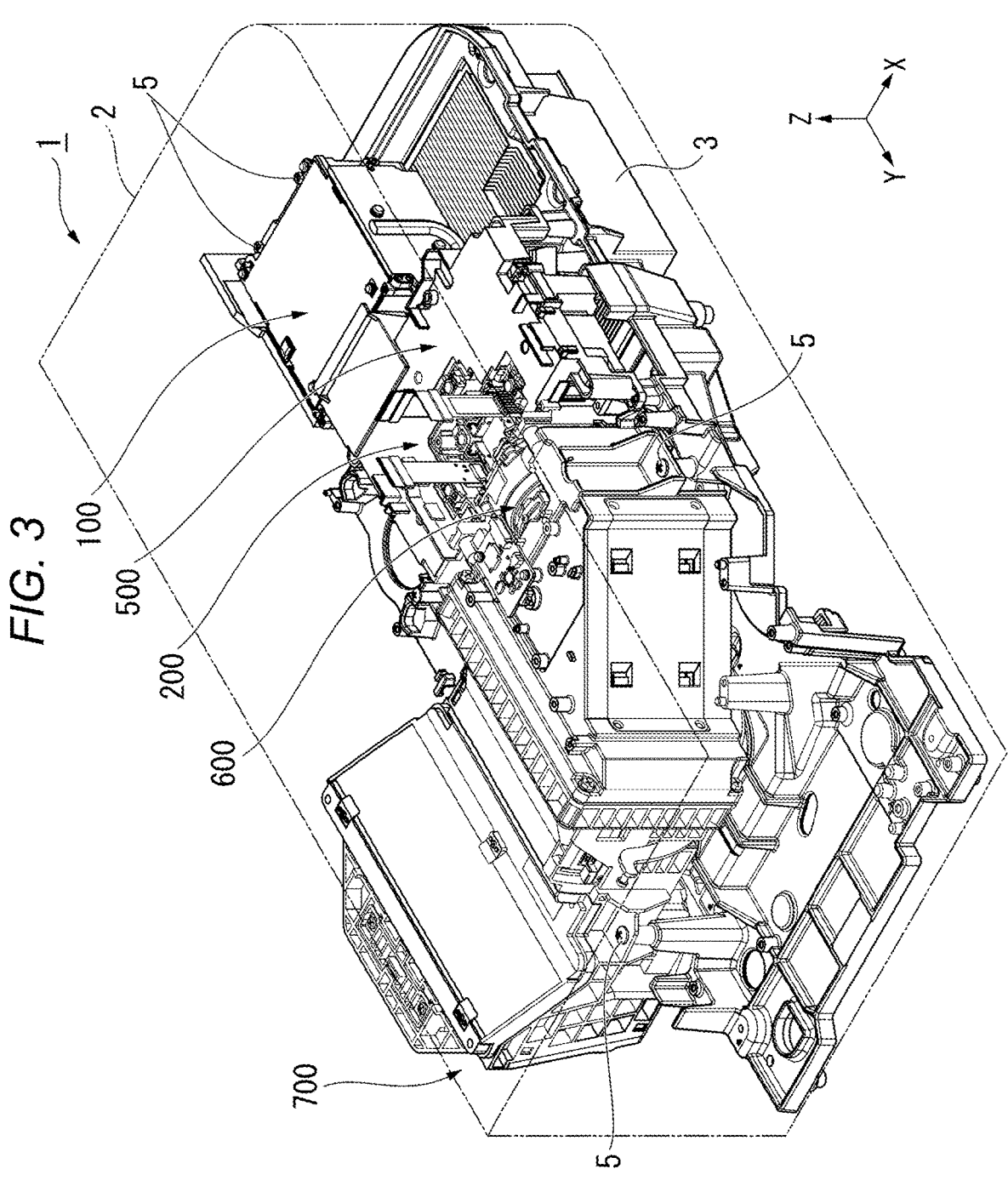
FIG. 3 is a perspective view showing key configurations of the projector.

FIG. 3 is a perspective view showing key configurations of the projector.

The projector 1 according to the present embodiment further includes an outer enclosure 2 and a base (base substrate) 3, as shown in FIG. 3. The outer enclosure 2 is a member made of a resin material and constitutes the exterior of the projector 1. The base 3 is formed of a frame member made of metal and is fixed to the outer enclosure 2. The light source apparatus 100, the image generator 200, the light guiding optical apparatus 500, the optical path changer 600, and the projection optical apparatus 700 are housed in the outer enclosure 2 along with the base 3 to which the components described are directly or indirectly fixed.

The projection optical apparatus 700 is fixed to the base 3 via screw members 5. The projection optical apparatus 700 in the present embodiment employs a single focal point scheme in which the image light LT is enlarged and projected from a position relatively close to the screen SCR, and therefore includes the two lens groups (first lens group 711 and second lens group 712) and the two mirrors (first reflection mirror 730 and second reflection mirror 740) as described above. Therefore, the projection optical apparatus 700 has a largest mass among the parts incorporated in the projector 1, and the mass of the projection optical apparatus 700 is greater than the total mass of the optical path changer 600, the image generator 200, and the light guiding optical apparatus 500.

The light source apparatus 100 in the present embodiment uses laser light and therefore includes a cooler such as a heat sink to cool the laser light source. The light source apparatus 100 is therefore a member having a large mass, as is the projection optical apparatus 700, among the parts incorporated in the projector 1. In the present embodiment, the light source apparatus 100 is fixed to the base 3 via the screw members 5. Employing a configuration in which the light source apparatus 100, which has a large mass, is not directly fixed to the light guide optics enclosure 503, can therefore suppress occurrence of distortion of the light guide optics enclosure 503.

As described above, the projector 1 according to the present embodiment employs a structure in which the projection optical apparatus 700 and the light source apparatus 100, which each have a large mass, are fixed to the base 3.

The projector 1 according to the present embodiment further employs a structure in which the image generator 200, the light guiding optical apparatus 500, and the optical path changer 600 are fixed to the projection optical apparatus 700.

The image generator 200 and the optical path changer 600 are indirectly fixed to the base 3 via the projection optical apparatus 700.

The right side (+X) of the light guiding optical apparatus 500, which is the side facing one end, of the light guiding optical apparatus 500, in the rightward-leftward direction X, is fixed to the projection optical apparatus 700, and the left side (−X) of the light guiding optical apparatus 500, which is the side facing the other end, of the light guiding optical apparatus 500, in the rightward-leftward direction X, is fixed to the base 3 via a floating fixation mechanism that will be described later.

Figure 4:
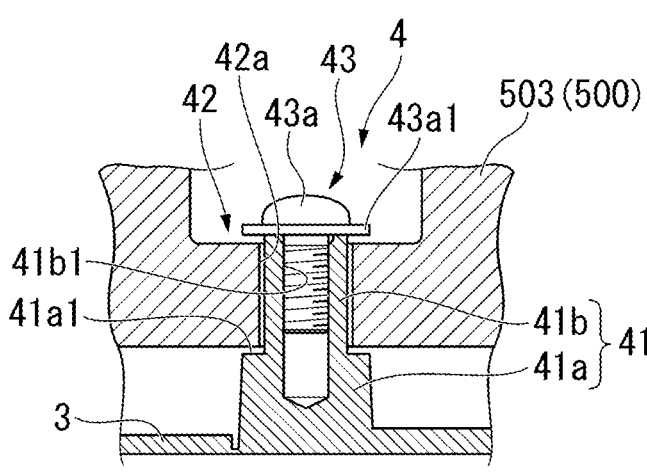
FIG. 4 is a cross-sectional view of a floating fixation mechanism.
Figure 4:
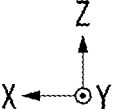

FIG. 4 is a cross-sectional view showing the configuration of the floating fixation mechanism.

The floating fixation mechanism 4 includes a support pin 41, a pin insertion section 42, and a screw member 43, as shown in FIG. 4. The floating fixation mechanism 4 fixes the light guiding optical apparatus 500 and the light guide optics enclosure 503 of the light guiding optical apparatus 500 to each other with the amount of relative movement between the base 3 and the light guide optics enclosure 503 restricted.

The support pin 41 is provided in a support region, of the base 3, that supports the light guiding optical apparatus 500. The support pin 41 includes a seat 41a and a pin 41b. The seat 41a has a planar surface 41a1. The pin 41b extends upward (+Z) from the planar surface 41a1 of the seat 41a and is inserted into the pin insertion section 42. The pin 41b is provided with a screw hole 41b1, to which the screw member 43 is fastened.

The pin insertion section 42 is formed in the light guide optics enclosure 503 and has an opening 42a, into which the pin 41b of the support pin 41 is inserted.

The inner diameter of the opening 42a of the pin insertion section 42 is greater than the outer diameter of the pin 41b of the support pin 41. A gap is therefore created between the pin 41b and the inner surface of the opening 42a with the pin 41b inserted into the opening 42a. The pin insertion section 42 into which the pin 41b is inserted has predetermined play in the radial direction, that is, is movable in the radial direction.

In the upward-downward direction Z, the opening 42a of the pin insertion section 42 has a depth smaller than the height of the pin 41b of the support pin 41. The upper surface of the pin 41b therefore protrudes from the opening 42a with the pin 41b inserted into the opening 42a. The pin insertion section 42 into which the pin 41b is inserted has predetermined play in the upward-downward direction Z, that is, is movable in the upward-downward direction Z. In the present embodiment, the light guide optics enclosure 503 of the light guiding optical apparatus 500 floats with respect to the base 3 (floating state).

If the light guide optics enclosure 503 is fixed both to the projection lens enclosure 720 and the light source apparatus 100, the light guide optics enclosure 503, which has relatively low rigidity, may be distorted due to positional displacement caused by dimensional tolerance of portions where the light guide optics enclosure 503 is fastened to the projection lens enclosure 720 and the light source apparatus 100. In contrast, in the present embodiment, since the light guide optics enclosure 503 is not fixed to the light source apparatus 100, the light guide optics enclosure 503 is not subjected to any external force produced by positional displacement caused by the dimensional tolerance, and is free from positional displacement or distortion caused by the external force. The projection lens enclosure 720 is therefore positioned more precisely with respect to the light source apparatus 100 and can be efficiently capture the light from the light source apparatus 100.

The screw member 43 is fastened to the screw hole 41b1 of the pin 41b inserted into the pin insertion section 42. A head section 43a of the screw member 43 includes a flange 43a1, which overhangs outward in the radial direction. The flange 43a1 may be replaced, for example, with a washer separate from the head section 43a.

The flange 43a1 of the screw member 43 is larger than the inner diameter of the opening 42a of the pin insertion section 42. Therefore, when the light guide optics enclosure 503 (pin insertion section 42) moves upward (+Z) with respect to the base 3 (support pin 41), the flange 43a1 of the screw member 43 comes into contact with the pin insertion section 42 and restricts the upward (+Z) movement of the light guide optics enclosure 503.

On the other hand, when the light guide optics enclosure 503 (pin insertion section 42) moves downward (−Z) with respect to the base 3 (support pin 41), the support pin 41 (seat 41a) comes into contact with the pin insertion section 42 and restricts the downward (−Z) movement of the light guide optics enclosure 503.

In the projector 1 according to the present embodiment, the floating fixation mechanism 4 can restrict the amount of relative movement in the upward-downward and rightward-leftward directions between the base 3 and the light guide optics enclosure 503, which floats with respect to the base 3, of the light guiding optical apparatus 500.

The structure that fixes the projection optical apparatus 700 to each member will be described below with reference to the drawings.

Figure 5:
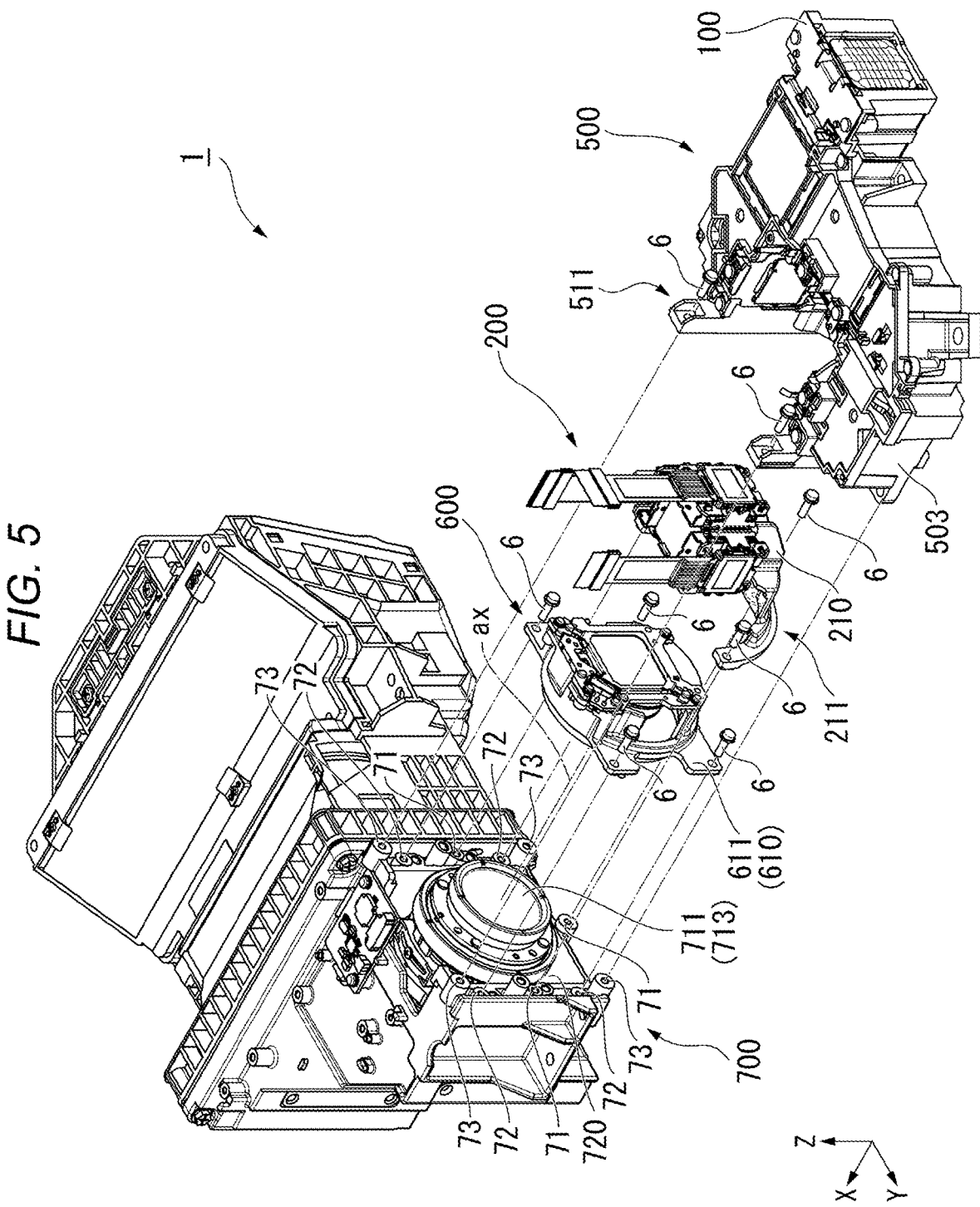
FIG. 5 is an exploded perspective view showing key configurations of the projector.

FIG. 5 is an exploded perspective view showing key configurations of the projector 1.

The panel holder 210 of the image generator 200 includes a first extending section 211, which extends toward the projection lens enclosure 720, as shown in FIG. 5. The right side (+X) of the first extending section 211 of the panel holder 210 is fixed to the projection lens enclosure 720 via a screw member 6.

The enclosure 610 of the optical path changer 600 includes a second extending section 611, which extends toward the projection lens enclosure 720. The right side (+X) of the second extending section 611 of the enclosure 610 is fixed to the projection lens enclosure 720 via the screw members 6.

The light guide optics enclosure 503 of the light guiding optical apparatus 500 includes a third extending section 511, which extends toward the projection lens enclosure 720. The right side (+X) of the third extending section 511 of the light guide optics enclosure 503 is fixed to the projection lens enclosure 720 via the screw members 6.

Figure 6:
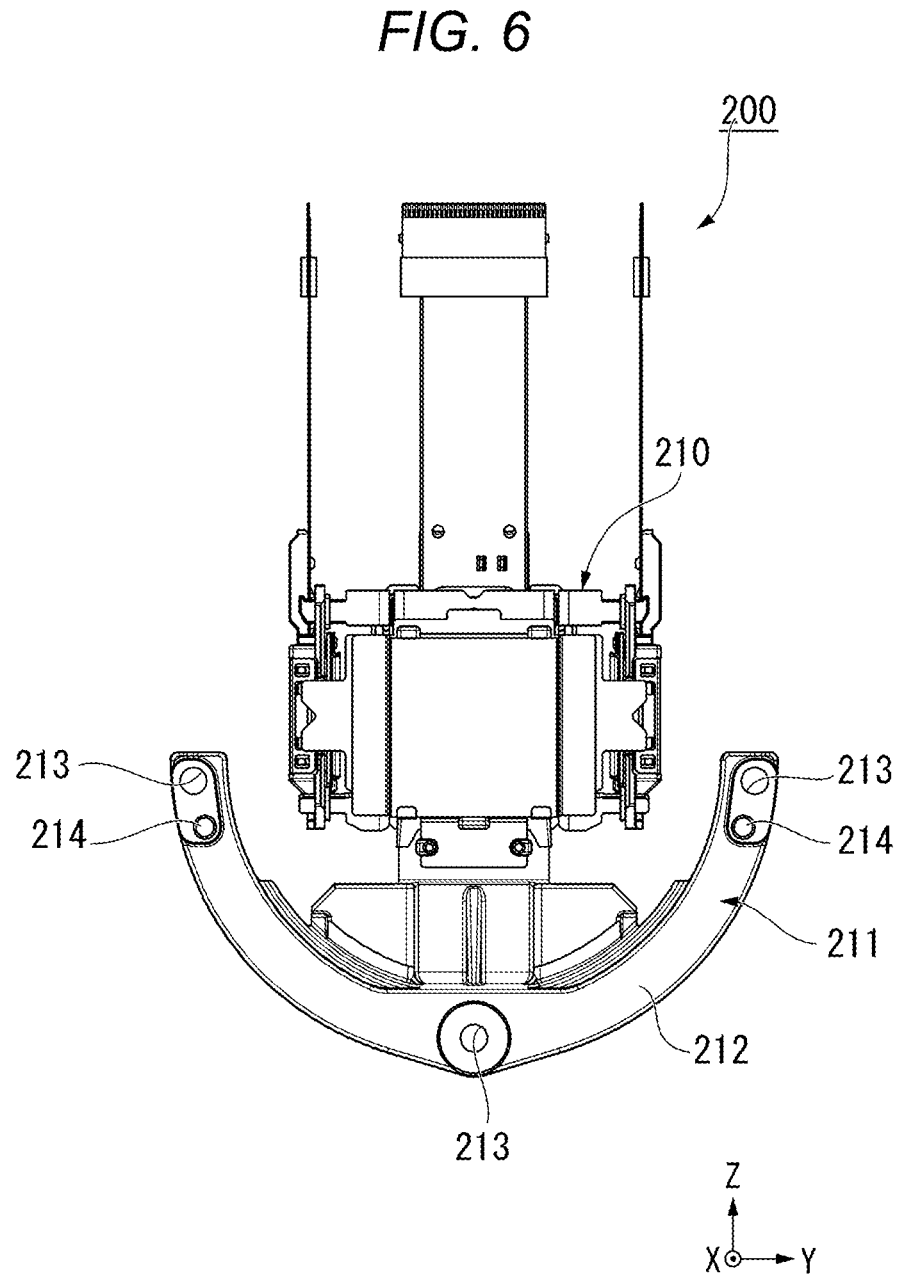
FIG. 6 is a plan view of an image generator.

FIG. 6 is a plan view of the image generator 200 viewed from the right side (+X).

In the panel holder 210 of the image generator 200, the first extending section 211 includes a first fixed section 212, which is fixed to the projection lens enclosure 720, as shown in FIG. 6. The first fixed section 212 has a substantially U-letter-like shape when viewed in the rightward-leftward direction X. The first fixed section 212 is provided with through holes 213, into which the screw members 6 are inserted, and positioning pins 214, which are used to position the first fixing section 71. In the present embodiment, the first fixed section 212 are provided with three through holes 213 in total, one at each of the opposite ends of the first fixed section 212, and one at the center thereof. Two positioning pins 214 in total are provided, one at each of the opposite ends of the first fixed section 212 and below (−Z) the through hole 213.

In the enclosure 610 of the optical path changer 600, the second extending section 611 includes a second fixed section (fixed section) 612, which is fixed to the projection lens enclosure 720, as shown in FIG. 2. The second fixed section 612 includes a tubular section 612a, which has a substantially tubular shape when viewed in the rightward-leftward direction X, and a pair of plate-shaped sections 612b, which overhang frontward (+Y) and rearward (−Y), respectively, from the tubular section 612a. The plate-shaped sections 612b are each provided with through holes 614, into which the screw members 6 are inserted, a positioning pin 615, which is used to position the second fixing section 72, and a cutout 616. In the present embodiment, the plate-shaped sections 612b are each separated by the cutout 616 in the upward/downward direction Z.

Four through holes 614 in total are provided, one in each of the portions, of the plate-shaped sections 612b, that are separated by the cutout 616. Two positioning pins 615 in total are provided, one below (−Z) each of the two through holes 614 located at the upper side (+Z) of the plate-shaped sections 612b.

Figure 7:
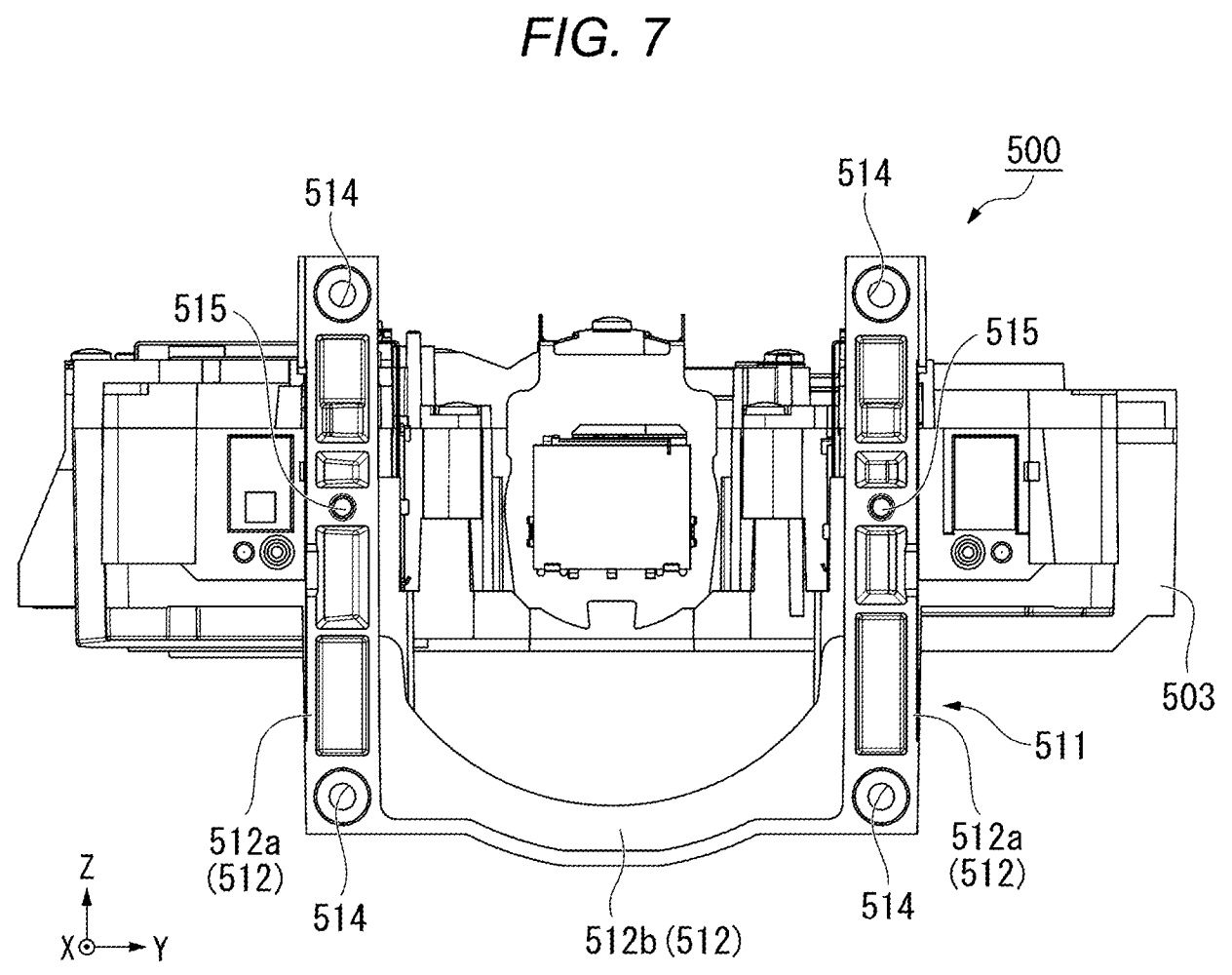

FIG. 7 is a plan view of the light guiding optical apparatus 500 viewed from the right side (+X).

In the light guide optics enclosure 503 of the light guiding optical apparatus 500, the third extending section 511 includes a third fixed section 512, which is fixed to the projection lens enclosure 720, as shown in FIG. 7. The third fixed section 512 includes a pair of columnar sections 512a, and a linkage section 512b. The pair of columnar sections 512a are disposed so as to sandwich the optical axis of the light guiding optical apparatus 500 in the frontward-rearward direction Y when viewed from the right side (+X) to the left side (−X), and extend in the upward-downward direction Z. The linkage section 512b is a portion that links lower (−Z) portions of the pair of columnar sections 512a to each other.

The pair of columnar sections 512a are each provided with through holes 514, into which the screw members 6 are inserted, and a positioning pin 515, which is used to position the third fixing section 73. In the present embodiment, four through holes 514 in total are provided, one at each of the upper and lower ends of each of the columnar sections 512a. Two positioning pins 515 in total are provided, one at the center, of each of the columnar sections 512a, in the upward-downward direction Z.

Figure 8:
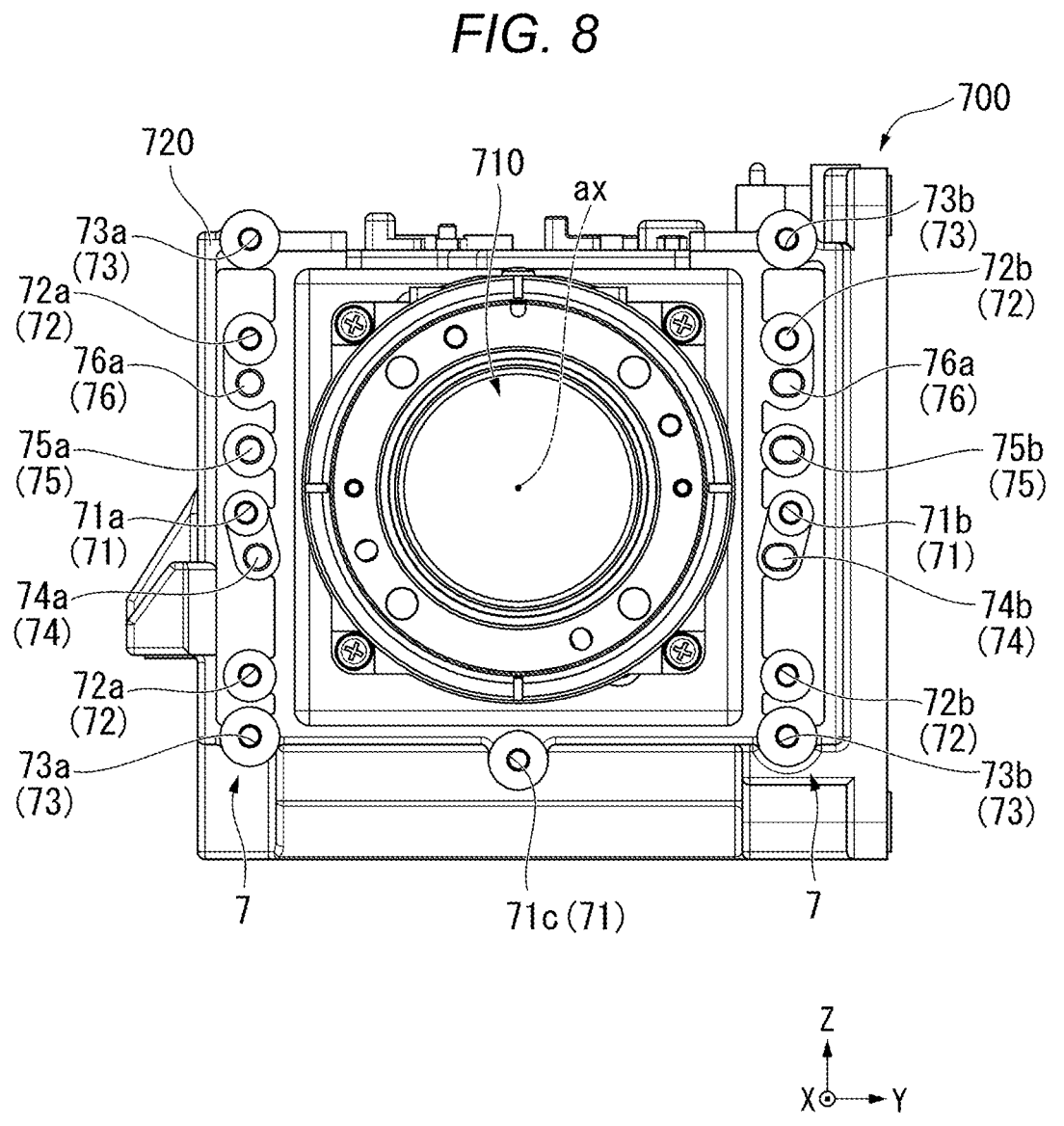

FIG. 8 is a plan view showing key portions of the projection lens enclosure 720 of the projection optical apparatus 700.

The projection lens enclosure 720 includes an attachment section 7, to which the light guiding optical apparatus 500, the image generator 200, and the optical path changer 600 are attached, as shown in FIG. 8.

The attachment section 7 includes a first fixing section 71, a second fixing section 72, a third fixing section 73, a first positioning section 74, a second positioning section 75, a third positioning section 76.

The first fixing section 71 is a portion to which the panel holder 210 of the image generator 200 is fixed. The first fixing section 71 is formed of a plurality of screw holes, into which the screw members 6 are fastened to fix the panel holder 210 to the projection lens enclosure 720.

The first fixing section 71 fixes the first fixed section 212 of the first extending section 211 (panel holder 210). The first fixing section 71 has a screw hole (first screw hole) 71a, a screw hole (second screw hole) 71b, and a screw hole 71c. The screw hole 71a is located at the front side (+Y) with respect to the optical axis ax of the projection system 710, which is one side of the frontward-rearward direction Y (second direction) perpendicular to the rightward-leftward direction X (first direction). The screw hole 71b is located at the rear side (−Y) with respect to the optical axis ax of the projection system 710, which is the other side of the frontward-rearward direction Y. The screw hole 71c is located at the lower side (−Z) with respect to the optical axis ax of the projection system 710 in the upward-downward direction Z.

The configuration in which the first fixing section 71 fastens the panel holder 210 at the three locations can achieve a structure that hardly causes distortion of the panel holder 210 fixed to the projection lens enclosure 720.

The second fixing section 72 is a portion to which the enclosure 610 of the optical path changer 600 is fixed and attached. The second fixing section 72 is formed of a plurality of screw holes, into which the screw members 6 are fastened to fix the enclosure 610 to the projection lens enclosure 720.

The second fixing section 72 fixes the second fixed section 612 of the second extending section 611 (enclosure 610). The second fixing section 72 has two screw holes (third screw hole) 72a and two screw holes (fourth screw hole) 72*b*. The screw holes 72*a* are located at the front side (+Y) of the frontward-rearward direction Y with respect to the optical axis ax of the projection system 710. The screw holes 72*b* are located at the rear side (−Y) of the frontward-rearward direction Y with respect to the optical axis ax of the projection system 710.

In the present embodiment, the two screw holes 72*a* in the second fixing section 72 are disposed so as to sandwich the screw hole 71*a* in the first fixing section 71 in the upward-downward direction Z. The two screw holes 72*b* in the second fixing section 72 are disposed in positions where the two screw holes 72*b* sandwich the screw hole 71*b* in the first fixing section 71 in the upward-downward direction Z.

The configuration in which the second fixing section 72 fastens the enclosure 610 at the four locations can achieve a structure that hardly causes distortion of the enclosure 610 fixed to the projection lens enclosure 720.

The third fixing section 73 is a portion to which the light guide optics enclosure 503 of the light guiding optical apparatus 500 is fixed and attached. The third fixing section 73 is formed of a plurality of screw holes, into which the screw members 6 are fastened to fix the light guide optics enclosure 503 to the projection lens enclosure 720.

The third fixing section 73 fixes the third fixed section 512 of the third extending section 511 (light guide optics enclosure 503). The third fixing section 73 has two screw holes (fifth screw hole) 73*a* and two screw holes (sixth screw hole) 73*b*. The screw holes 73*a* are located at the front side (+Y) of the frontward-rearward direction Y with respect to the optical axis ax of the projection system 710. The screw holes 73*b* are located at the rear side (−Y) of the frontward-rearward direction Y with respect to the optical axis ax of the projection system 710.

In the present embodiment, the two screw holes 73*a* in the third fixing section 73 are disposed so as to sandwich the two screw holes 72*a* in the second fixing section 72 in the upward-downward direction Z. The two screw holes 73*b* in the third fixing section 73 are disposed in positions where the two screw holes 73*b* sandwich the two screw holes 72*b* in the second fixing section 72 in the upward-downward direction Z.

The configuration in which the third fixing section 73 fastens the light guide optics enclosure 503 at the four locations can achieve a structure that hardly causes distortion of the light guide optics enclosure 503 fixed to the projection lens enclosure 720.

In the projection lens enclosure 720 in the present embodiment, the screw holes 71*a*, 72*a*, and 73*a* are linearly arranged along the upward-downward direction Z (third direction) perpendicular to the rightward-leftward direction X and the frontward-rearward direction Y. The screw holes 71*b*, 72*b*, and 73*b* are also linearly arranged along the upward-downward direction Z.

The first positioning section 74 has two first positioning holes 74*a*.

The first positioning section 74 causes the positioning pins 214, which extend from the first fixed section 212 of the panel holder 210, to be inserted into the first positioning holes 74*a* to position the panel holder 210, which holds the light modulators 400R, 400G, and 400B, and the projection lens enclosure 720, which holds the projection system 710.

Based on the configuration described above, the first positioning section 74 can specify the positional relationship of the light modulators 400R, 400G, and 400B with the projection system 710. In the present embodiment, forming one (rear side (−Y)) of the two first positioning holes 74*a* as an elongated hole allows accurate positioning irrespective of variation in the dimension between the two first positioning holes 74*a*, achieving improvement in the workability during the positioning.

The second positioning section 75 includes two second positioning holes 75*a*.

The second positioning section 75 causes a positioning pins 615, which extend from the plate-shaped sections 612*b* of the enclosure 610, to be inserted into the second positioning holes 75*a* to position the enclosure 610, which holds the light transmissive substrate 601, and the support frame 602, which supports the light transmissive substrate 601, with respect to the projection lens enclosure 720, which holds the projection system 710. Based on the configuration described above, the second positioning section 75 can specify the positional relationship between light transmissive substrate 601 and the projection system 710. In the present embodiment, forming one (rear side (−Y)) of the two second positioning holes 75*a* as an elongated hole allows accurate positioning irrespective of variation in the dimension between the two second positioning holes 75*a*, achieving improvement in the workability during the positioning.

The third positioning section 76 includes two third positioning holes 76*a*.

The third positioning section 76 causes a positioning pins 515, which extend from the columnar sections 512*a* of the light guide optics enclosure 503, to be inserted into the third positioning holes 76*a* to position the light guide optics enclosure 503, which holds the light guide system 501, and the projection lens enclosure 720, which holds the projection system 710. Based on the configuration described above, the third positioning section 76 can specify the positional relationship between light guide system 501 and the projection system 710. In the present embodiment, forming one (rear side (−Y)) of the two third positioning holes 76*a* as an elongated hole allows accurate positioning irrespective of variation in the dimension between the two third positioning holes 76*a*, achieving improvement in the workability during the positioning.

Figure 9:
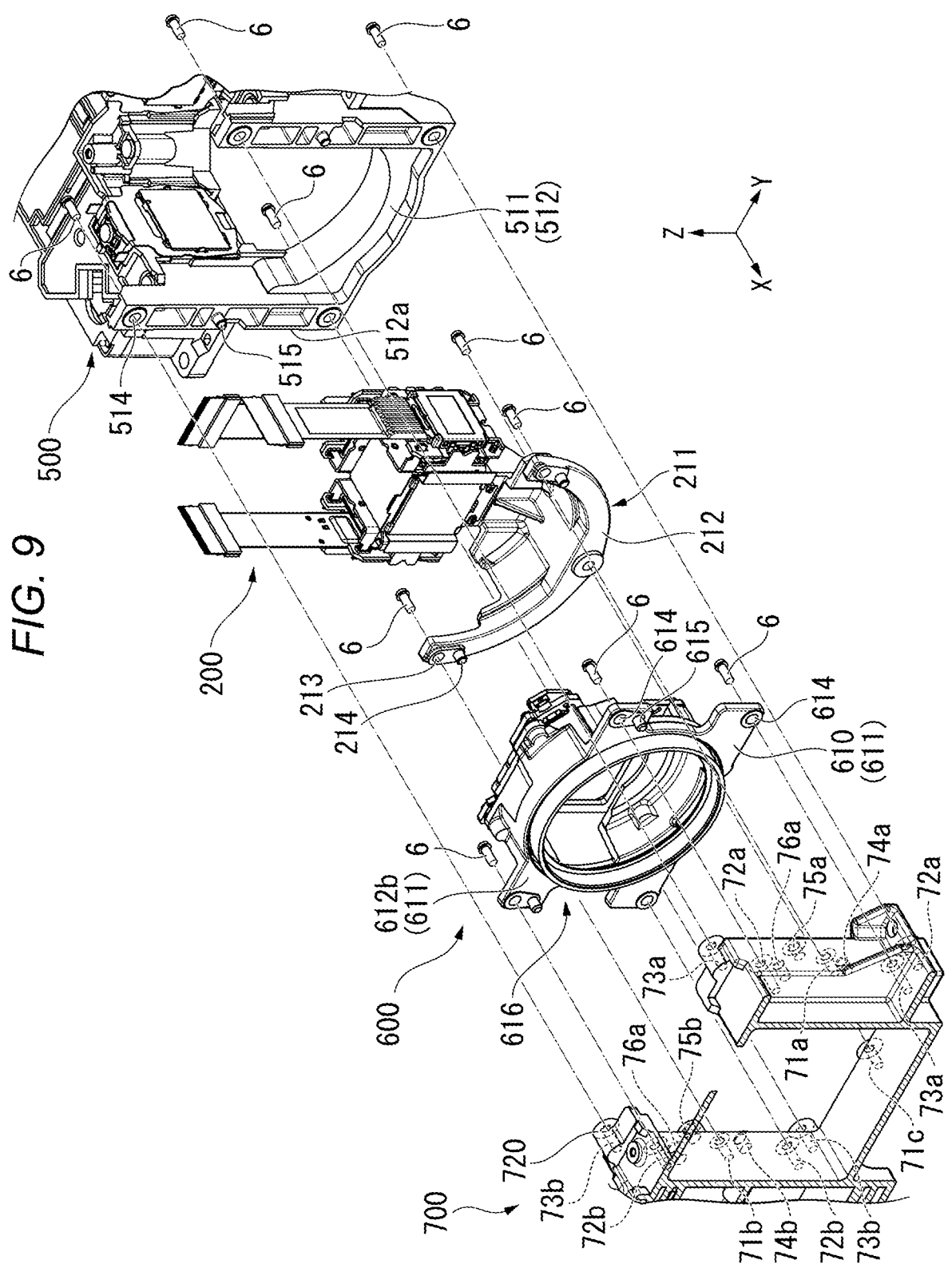
FIG. 9 is a perspective view showing the correspondence between a projection lens enclosure and each member.

FIG. 9 is a perspective view showing the correspondence between the projection lens enclosure 720 and the members. FIG. 9 shows the projection lens enclosure 720 and each of the members separate from each other in the rightward-leftward direction X for clarity.

The through hole 213, which is provided at the rear side (−Y), of the first fixed section 212, in the frontward-rearward direction Y is located in the cutout 616 provided in the corresponding plate-shaped section 612*b* of the second fixed section 612, as shown in FIG. 9. The screw member 6 inserted into the through hole 213 provided at the front side (+Y), of the first fixed section 212, in the frontward-rearward direction Y is fastened to the screw hole 71*a* in the first fixing section 71 via the cutout 616.

The through hole 213, which is provided at the front side (+Y), of the first fixed section 212, in the frontward-rearward direction Y is located at the cutout 616 provided in the corresponding plate-shaped section 612*b* of the second fixed section 612. The screw member 6 inserted into the through hole 213 provided at the front side (+Y), of the first fixed section 212, in the frontward-rearward direction Y is fastened to the screw hole 71*b* in the first fixing section 71 via the cutout 616.

In the present embodiment, in the plan view viewed in the rightward-rearward direction X, the screw holes 71*a* and 71*b* are disposed in the cutouts 616 provided in the plate-shaped sections 612*b* of the second fixed section 612. The screw members 6 can therefore be fastened into the screw holes 71*a* and 71*b* in the first fixing section 71 with no interference between the first fixed section 212 and the second fixed section 612, which is located at a position shifted from the first fixed section 212 toward the projection system 710 (rightward (+X)).

The screw member 6 inserted into the through hole 213 provided at the center, of the first fixed section 212, in the frontward-rearward direction Y is fastened into the screw hole 71c in the first fixing section 71.

The positioning pins 214 provided at the first fixed section 212 are located in the cutouts 616 provided in the plate-shaped sections 612b of the second fixed section 612. In the present embodiment, in the plan view viewed in the rightward-leftward direction X, the first positioning section 74 (first positioning hole 74a) is disposed in the corresponding cutout 616. According to the configuration described above, the positioning pin 214 does not interfere with the second fixed section 612 but can be inserted into the first positioning hole 74a in the first positioning section 74.

The screw members 6 inserted into the through holes 614 provided in the plate-shaped section 612b located at the front side (+Y), of the second fixed section 612, in the frontward-rearward direction Y are fastened into the two screw holes 72a in the second fixing section 72. The screw members 6 inserted into the through holes 614 provided in the plate-shaped section 612b located at the rear side (−Y), of the second fixed section 612, in the frontward-rearward direction Y are fastened into the two screw holes 72b in the second fixing section 72.

The screw members 6 inserted into the through holes 514 provided in the columnar section 512a located at the front side (+Y), of the third fixed section 512, in the frontward-rearward direction Y are fastened into the two screw holes 73a in the third fixing section 73. The screw members 6 inserted into the through holes 514 provided in the columnar section 512a located at the rear side (−Y), of the third fixed section 512, in the frontward-rearward direction Y are fastened into the two screw holes 73b in the third fixing section 73.

The positions where the first extending section 211, the second extending section 611, and the third extending section 511 are fixed in the projection lens enclosure 720 differ from one another in the rightward-leftward direction X (first direction) along the optical axis ax of the projection system 710, as shown in FIG. 5.

In the present embodiment, the third fixing section 73, to which the third fixed section 512 of the third extending section 511 (light guide optics enclosure 503) is fixed, is provided at a position farthest from the projection lens enclosure 720 in the rightward-leftward direction X. The second fixing section 72, to which the second fixed section 612 of the second extending section 611 (enclosure 610) is fixed, is provided at a position closest to the projection lens enclosure 720 in the rightward-leftward direction X. The first fixing section 71, to which the first fixed section 212 of the first extending section 211 (panel holder 210) is fixed, is provided between the second fixed section 612 and the third fixed section 512 in the rightward-leftward direction X.

As described above, in the present embodiment, the second fixing section 72, the first fixing section 71, and the third fixing section 73 are disposed in this order in the rightward-leftward direction X in the vicinity of the projection lens enclosure 720.

In the projection lens enclosure 720 in the present embodiment, the first fixing section 71, the second fixing section 72, and the third fixing section 73 differ from one another in terms of position in the rightward-leftward direction X. In the present embodiment, the first fixing section 71, the second fixing section 72, and the third fixing section 73 are located at the light exiting side (right side (+X)) of a lens 713 of the first lens group 711, which is the lens closest to the light incident side out of the plurality of lenses of the projection system 710.

As described above, the projector 1 according to the present embodiment includes the light source apparatus 100, the image generator 200, the optical path changer 600, and the projection optical apparatus 700, and the panel holder 210 of the image generator 200 and the enclosure 610 of the optical path changer 600 are fixed to the projection lens enclosure 720 of the projection optical apparatus 700.

In the projector 1 according to the present embodiment, in which the panel holder 210 and the enclosure 610 are directly fixed to the projection lens enclosure 720, there are no other components between the panel holder 210 and the projection lens enclosure 720 and between the enclosure 610 and the projection lens enclosure 720, whereby the apparatus configuration can be downsized. In addition, the increased positional accuracy of the panel holder 210, the optical path changer 600, and the projection lens enclosure 720 allows an increase in the efficiency at which the light from the light source apparatus 100 is utilized and further allows the projector 1 to project high-quality images.

In the present embodiment, the projection lens enclosure 720 includes the first positioning section 74, which specifies the relative positional relationship of the light modulators 400R, 400G, and 400B with the projection system 710, and the second positioning section 75, which specifies the relative positional relationship of the light transmissive substrate 601 with the projection system 710.

According to the configuration described above, the light modulators 400R, 400G, and 400B and the projection system 710 are relatively positioned at increased accuracy, and so are the light transmissive substrate 601 and the projection system 710. The efficiency at which the light from the light source apparatus 100 is utilized can therefore be further improved.

The projector 1 according to the present embodiment further includes the light guiding optical apparatus 500. The light guiding optical apparatus 500 includes the light guide system 501 and the light guide optics enclosure 503, and the light guide optics enclosure 503 is fixed to the projection lens enclosure 720.

According to the configuration described above, in which the light guide optics enclosure 503 is directly fixed to the projection lens enclosure 720, the apparatus configuration can be downsized by a greater degree. In addition, the increased positional accuracy of the light guide optics enclosure 503, the panel holder 210, the optical path changer 600, and the projection lens enclosure 720 allows further improvement in the light utilization efficiency and enhancement in image quality.

In the present embodiment, the projection lens enclosure 720 further includes the third positioning section 76, which specifies the relative positional relationship between the light guide system 501 and the projection system 710.

According to the configuration described above, the increased positional accuracy of the light guide system 501 and the projection system 710 allows the light outputted from the light source apparatus 100 and traveling via the light guide system 501 to be efficiently guided to the projection system 710. Therefore, the light utilization efficiency can be further improved, and the image quality can be further enhanced.

In the present embodiment, the panel holder 210 is fixed to the projection lens enclosure 720 via the first extending section 211, the enclosure 610 is fixed to the projection lens enclosure 720 via the second extending section 611, and the light guide optics enclosure 503 is fixed to the projection lens enclosure 720 via the third extending portion 511. In the plan view viewed in the rightward-leftward direction X along the optical axis ax of the projection system 710, the first extending section 211, the second extending section 611, and the third extending section 511 partially overlap each other.

According to the configuration described above, the first extending section 211, since the second extending section 611, and the third extending section 511 partially overlap each other in the rightward-leftward direction X, an increase in the size in the direction that intersects the rightward-leftward direction X (frontward-rearward direction Y) can be suppressed.

In the present embodiment, the projection lens enclosure 720 includes the first fixing section 71 for fixing the panel holder 210, the second fixing section 72 for fixing the enclosure 610, and the third fixing section 73 for fixing the light guide optics enclosure 503, and the first fixing section 71, the second fixing section 72, and the third fixing section 73 differ from one another in terms of position in the rightward-leftward direction X.

According to the configuration described above, in the projection lens enclosure 720, the position (first fixed section 212) where the first extending section 211 is fixed to the first fixing section 71, the position (second fixed section 612) where the second extending section 611 is fixed to the second fixing section 72, and the position (third fixed section 512) where the third extending section 511 is fixed to the third fixing section 73 can be shifted in the rightward-leftward direction X. Interference between the first fixed section 212, the second fixed section 612, and the third fixed section 512, which are arranged in the rightward-leftward direction X, can thus be suppressed.

In the present embodiment, the first fixing section 71, the second fixing section 72, and the third fixing section 73 are located at the light exiting side (right side (+X)) of the lens 713, which is closest to the light incident side out of the plurality of lenses of the projection system 710.

According to the configuration described above, the image generator 200, the optical path changer 600, and the light guiding optical apparatus 500, which are held by the fixing sections 71, 72, and 73, respectively, can be disposed close to the lens 713 of the first lens group 711. An increase in the dimension of the projector 1 in the rightward-leftward direction X can thus be suppressed.

In the present embodiment, the first fixing section 71 has the screw hole 71a located at the front side (+Y) of the frontward-rearward direction Y, and the screw hole 71b located at the rear side (−Y) of the frontward-rearward direction Y, the second fixing section 72 has the screw holes 72a located at the front side (+Y) of the frontward-rearward direction Y, and the screw holes 72b located at the rear side (−Y) of the frontward-rearward direction Y, and the third fixing section 73 has the screw holes 73a located at the front side (+Y) of the frontward-rearward direction Y, and the screw holes 73b located at the rear side (−Y) of the front-ward-rearward direction Y. The screw holes 71a, 72a, and 73a are linearly arranged along the upward-downward direction Z, and the screw holes 71b, 72b, and 73b are linearly arranged along the upward-downward direction Z.

According to the configuration described above, the positions where the screw holes are formed in the projection lens enclosure 720 are unlikely to disperse in the rightward-leftward direction X. An increase in the dimension of the projection lens enclosure 720 in the rightward-leftward direction X can thus be suppressed.

In the present embodiment, in the plan view viewed in the rightward-rearward direction X, the screw holes 71a and 71b are disposed in the cutouts 616 provided in the plate-shaped sections 612b of the second fixed section 612.

According to the configuration described above, the first extending section 211 can be fixed to the projection lens enclosure 720 via the cutouts 616 with interference between the first extending section 211 and the second extending section 611, which is located at a position shifted from the first extending section 211 toward the projection system 710, avoided. Furthermore, the avoidance of the interference between the first extending section 211 and the second extending section 611 can achieve the configuration in which the screw holes 71a, 72a, and 73a are linearly arranged in the upward-downward direction Z, and so are the screw holes 71b, 72b, and 73b, as described above.

In the present embodiment, the projector 1 further includes the exterior enclosure 2, which houses the light source apparatus 100, the image generator 200, the optical path changer 600, the projection optical apparatus 700, and the light guiding optical apparatus 500, the base 3, which is fixed to the exterior enclosure 2 and to which the projection optical apparatus 700 and the light source apparatus 100 are fixed, and the floating fixation mechanism 4, which fixes the base 3 and the light guide optics enclosure 503 of the light guiding optical apparatus 500 to each other with the amount of relative movement between the base 3 and the light guide optics enclosure 503 restricted.

According to the configuration described above, even if impact acts on the projector 1, the amount of relative movement of the light guide optics enclosure 503 of the light guiding optical apparatus 500, which floats with respect to the base 3, in the upward-downward and rightward-leftward directions can be restricted. A risk of damage to the light guide optics enclosure 503 due to deformation thereof resulting from the impact can thus be reduced.

In present embodiment, the mass of the projection optical apparatus 700 is greater than the total mass of the optical path changer 600, the image generator 200, and the light guiding optical apparatus 500.

In this case, since the members are fixed to the projection lens enclosure 720, which houses the projection optical apparatus 700 having a largest total mass among the components of the projector 1 and has high rigidity, the flexure and swing motion of the projection system 710 can be suppressed. Degradation of the image quality due to flexure or swing motion of the projection optical 710 can thus be suppressed.

The projection optical apparatus 700 in the present embodiment includes the second reflection mirror 740, which reflects and projects the light from the optical path changer 600.

The projection optical apparatus 700 in the present embodiment can enlarge and project the image light LT from a position relatively close to the screen SCR, which is a projection receiving surface. The projector 1 according to the present embodiment, which includes the projection optical apparatus 700, is therefore configured as a short-focal-length projector.

The aforementioned embodiment has been described with reference to the case where the first positioning section 74, the second positioning section 75, and the third positioning section 76, which position the members with respect to the projection lens enclosure 720, are provided separately from one another, but a common positioning section may be provided.

A configuration in which a common positioning section is provided will be described below as a variation.

Figure 10:
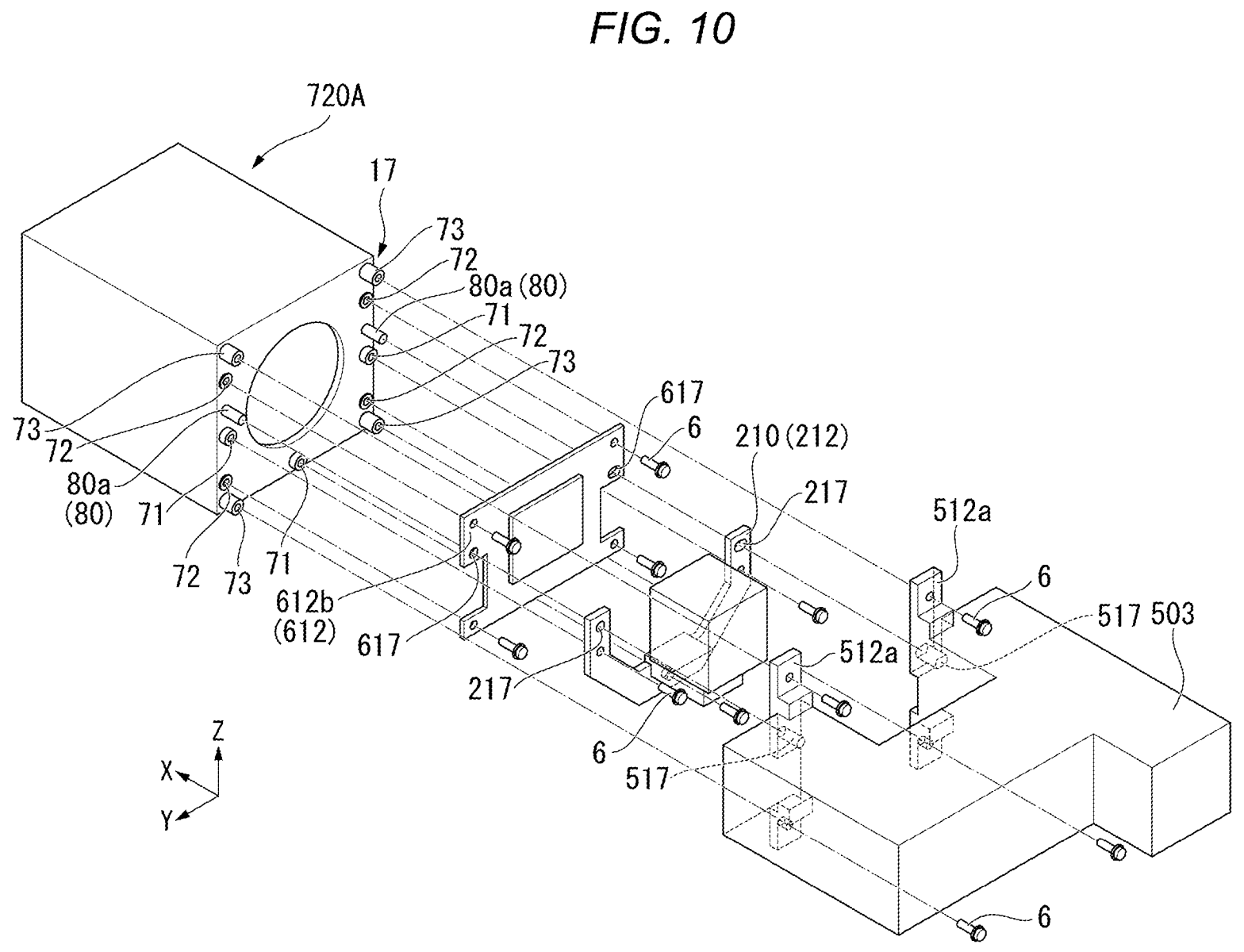

FIG. 10 is an exploded perspective view showing a structure that fixes the members to the projection lens enclosure in the variation. FIG. 10 diagrammatically shows a projection lens enclosure 720A and the members fixed to the projection lens enclosure 720A.

The projection lens enclosure 720A in the present variation includes an attachment section 17, as shown in FIG. 10. The attachment section 17 includes the first fixing section 71, the second fixing section 72, the third fixing section 73, and a positioning section 80.

The positioning section 80 includes two positioning pins 80a.

The positioning pins 80a are inserted into positioning holes 217 provided in the first fixed section 212 of the panel holder 210 to position the panel holder 210 and the projection lens enclosure 720A. The panel holder 210 is fixed to the first fixing section 71 via the screw members 6 with the positioning pins 80a inserted into the positioning holes 217.

The positioning pins 80a are further inserted into positioning holes 617 provided in the plate-shaped sections 612b of the enclosure 610 to position the enclosure 610 and the projection lens enclosure 720A. The enclosure 610 is fixed to the second fixing section 72 via the screw members 6 with the positioning pins 80a inserted into the positioning holes 617.

The positioning pins 80a are still further inserted into positioning holes 517 provided in the columnar sections 512a of the light guide optics enclosure 503 to position the light guide optics enclosure 503 and the projection lens enclosure 720A. The light guide optics enclosure 503 is fixed to the third fixing section 73 via the screw members 6 with the positioning pins 80a inserted into the positioning holes 517.

As described above, according to the projection lens enclosure 720A in the present variation, the panel holding section 210, the enclosure 610, and the light guide optics enclosure 503 can be positioned by the common positioning section 80 with respect to the projection lens enclosure 720A, whereby the configuration of the attachment section 17 can be simplified.

The technical scope of the present disclosure is not limited to the embodiment described above, and a variety of changes can be made thereto to the extent that the changes do not depart from the intent of the present disclosure.

In addition to the above, the number, arrangement, shape, material, and other specific factors of the variety of components that constitute the light source apparatus are not limited to those in the embodiment described above and can be changed as appropriate.

For example, the light source apparatus 100 in the embodiment described above does not necessarily employ the configuration using a laser light source and a wavelength converter and may employ a configuration using a laser light source alone or a configuration using an LED or a discharge-type light source lamp.

The aforementioned embodiment has been described with reference to the single focal point scheme by way of example, in which the projection optical apparatus 700 enlarges and projects the image light LT from a position relatively close to the screen SCR, which is a projection receiving surface, and a projection system corresponding to a typical focal length may instead be used.

The aforementioned embodiment has been described with reference to the case where the optical path changer 600 swings the light transmissive substrate 601 around the single swing axis J by way of example, and a configuration with two swing axes J around which the light transmissive substrate 601 is swung may instead be employed. According to the configuration described above, the width over which the optical path of the image light LT is adjusted can be expanded.

In the projector 1 according to the embodiment described above, an openable/closable shutter member may be provided on the optical path of the image light LT between the projection optical apparatus 700 and the image generator 200. In this case, the shutter member may be fixed to the projection lens enclosure 720 of the projection optical apparatus 700.

The aforementioned embodiment has been described with reference to the case where the projection optical apparatus 700 has the largest mass among the parts incorporated in the projector 1 by way of example, and the light guiding optical apparatus 500 may instead have the largest mass. In this case, the projection lens enclosure 720 of the projection system 710, the enclosure 610 of the optical path changer 600, and the panel holder 210 of the image generator 200 may be fixed via the screw members to the light guide optics enclosure 503 of the light guiding optical system 500.

In the projector 1 according to the embodiment described above, the panel holder 210, the enclosure 610, and the light guide optics enclosure 503 are fixed to the projection lens enclosure 720. Instead, the enclosure 610 and the light guide optics enclosure 503 may be fixed to the projection lens enclosure 720, and the panel holder 210 may not be fixed thereto. The projector according to the present aspect includes the light source apparatus 100, the image generator 200, the optical path changer 600, and the projection optical apparatus 700, and the enclosure 610 of the optical path changer 600 and the light guide optics enclosure 503 of the light guiding optical apparatus 500 are fixed to the projection lens enclosure 720. The panel holder 210 may be fixed to the base 3.

Still instead, the panel holder 210 and the light guide optics enclosure 503 may be fixed to the projection lens enclosure 720, and the enclosure 610 may not be fixed thereto. The projector according to the present aspect includes the light source apparatus 100, the image generator 200, the optical path changer 600, and the projection optical apparatus 700, and the panel holder 210 of the image generator 200 and the light guide optics enclosure 503 of the light guiding optical apparatus 500 are fixed to the projection lens enclosure 720. The enclosure 610 may be fixed to the base 3.

A projector according to an aspect of the present disclosure may have the configuration described below.

The projector according to the aspect of the present disclosure includes a light source apparatus, an image generator that modulates light from the light source apparatus to generate image light, an optical path changer that changes the optical path of the image light generated by the image generator, and a projection optical apparatus that projects the image light having an optical path changed by the optical path changer. The image generator includes a light modulator that modulates the light from the light source apparatus in accordance with image information to generate the image light, and a first holder that holds the light modulator. The optical path changer includes an optical member that the image light outputted from the image generator enters, an optical support section that pivotably supports the optical member, and a second holder that holds the optical support section. The projection optical apparatus includes a projection system that the light from the optical path changer enters, and a third holder that holds the projection system. The first and second holders are fixed to the third holder.

In the projector according to the aspect of the present disclosure, the third holder may include a first positioning section that specifies the relative positional relationship between the light modulator and the projection system and a second positioning section that specifies the relative positional relationship between the optical member and the projection system.

The projector according to the aspect of the present disclosure may further include a light guiding optical apparatus that guides the light outputted from the light source apparatus to the image generator, the light guiding optical apparatus may include a light guide system that guides the light outputted from the light source apparatus and a fourth holder that holds the light guide system, and the fourth holder may be fixed to the third holder.

In the projector according to the aspect of the present disclosure, the third holder may further include a third positioning section that specifies the relative positional relationship between the light guide system and the projection system.

In the projector according to the aspect of the present disclosure, the first holder of the image generator may include a first extending section that extends toward the third holder. The second holder of the optical path changer may include a second extending section that extends toward the third holder. The fourth holder of the light guiding optical apparatus may include a third extending section that extends toward the third holder. The first holder may be fixed to the third holder via the first extending section. The second holder may be fixed to the third holder via the second extending section. The fourth holder may be fixed to the third holder via the third extending section. In the plan view viewed in a first direction along the optical axis of the projection system, the first, second, and third extending sections may partially overlap with each other.

In the projector according to the aspect of the present disclosure, the third holder may include a first fixing section for fixing the first holder, a second fixing section for fixing the second holder, and a third fixing section for fixing the fourth holder, and the first, second, and third fixing sections may differ from one another in terms of position in the first direction.

In the projector according to the aspect of the present disclosure, the projection system may include a plurality of lenses, and the first, second, and third fixing sections may be located at the light exiting side of the lens located in a position closest to the light incident side out of the plurality of lenses of the projection system.

In the projector according to the aspect of the present disclosure, the first fixing section may have a first screw hole located at one side of a second direction perpendicular to the first direction with respect to the optical axis of the projection system, and a second screw hole located at the other side of the second direction with respect to the optical axis of the projection system. The second fixing section may have a third screw hole located at the one side of the second direction with respect to the optical axis of the projection system, and a fourth screw hole located at the other side of the second direction with respect to the optical axis of the projection system. The third fixing section may have a fifth screw hole located at the one side of the second direction with respect to the optical axis of the projection system, and a sixth screw hole located at the other side of the second direction with respect to the optical axis of the projection system. The first, third, and fifth screw holes may be linearly arranged along a third direction perpendicular to the first and second directions, and the second, fourth, and sixth screw holes may be linearly arranged along the third direction perpendicular to the first and second directions.

In the projector according to the aspect of the present disclosure, the second extending section may include a fixed section fixed to the second fixing section, and in the plan view viewed in the first direction, the first and second screw holes may be disposed in cutouts provided in the fixed section.

The projector according to the aspect of the present disclosure may further include an exterior enclosure that houses the light source apparatus, the image generator, the optical path changer, the projection optical apparatus, and the light guiding optical apparatus, a base substrate that is fixed to the exterior enclosure and to which the projection optical apparatus and the light source apparatus are fixed, and a floating fixation mechanism that fixes the base substrate and the fourth holder of the light guiding optical apparatus to each other with the amount of relative movement between the base substrate and the fourth holder restricted.

In the projector according to the aspect of the present disclosure, the mass of the projection optical apparatus may be greater than the total mass of the optical path changer, the image generator, and the light guiding optical apparatus.

A projector according to an aspect of the present disclosure may have the configuration described below.

The projector according to the aspect of the present disclosure includes a light source apparatus, an image generator that modulates light from the light source apparatus to generate image light, an optical path changer that changes the optical path of the image light generated by the image generator, a projection optical apparatus that projects the image light having an optical path changed by the optical path changer, and a light guiding optical apparatus that guides the light outputted from the light source apparatus. The image generator includes a light modulator that modulates the light from the light source apparatus in accordance with image information to generate the image light, and a first holder that holds the light modulator. The optical path changer includes an optical member that the image light outputted from the image generator enters, an optical support section that pivotably supports the optical member, and a second holder that holds the optical support section. The projection optical apparatus includes a projection system that the light from the optical path changer enters, and a third holder that holds the projection system. The light guiding optical apparatus includes a light guide system that the light outputted from the light source apparatus enters, and a fourth holder that holds the light guide system. The second and fourth holders are fixed to the third holder.

A projector according to an aspect of the present disclosure may have the configuration described below.

The projector according to the aspect of the present disclosure includes a light source apparatus, an image generator that modulates light from the light source apparatus to generate image light, an optical path changer that changes the optical path of the image light generated by the image generator, a projection optical apparatus that projects the image light having an optical path changed by the optical path changer, and a light guiding optical apparatus that guides the light outputted from the light source apparatus. The image generator includes a light modulator that modulates the light from the light source apparatus in accordance with image information to generate the image light, and a first holder that holds the light modulator. The optical path changer includes an optical member that the image light outputted from the image generator enters, an optical support section that pivotably supports the optical member, and a second holder that holds the optical support section. The projection optical apparatus includes a projection system that the light from the optical path changer enters, and a third holder that holds the projection system. The light guiding optical apparatus includes a light guide system that the light outputted from the light source apparatus enters, and a fourth holder that holds the light guide system. The first and fourth holders are fixed to the third holder.

In the projector according to the aspect of the present disclosure, the first holder of the light modulator may include a first extending section that extends toward the third holder. The second holder of the optical path changer may include a second extending section that extends toward the third holder. The fourth holder of the light guiding optical apparatus may include a third extending section that extends toward the third holder. The first holder may be fixed to the third holder via the first extending section. The second holder may be fixed to the third holder via the second extending section. The fourth holder may be fixed to the third holder via the third extending section. The third holder may include a first fixing section for fixing the first holder, a second fixing section for fixing the second holder, and a third fixing section for fixing the fourth holder, and the first, second, and third fixing sections may differ from one another in terms of position in a first direction along the optical axis of the projection system.

In the projector according to the aspect of the present disclosure, the projection optical apparatus may further include a reflective projection mirror that reflects and projects the light from the optical path changer.

In the present embodiment, the floating fixation mechanism 4 may restrict the amount of relative movement in the upward-downward and rightward-leftward directions between the base 3 and the light guide optics enclosure 503 of the light guiding optical apparatus 500, and may instead restrict the amount of relative movement in one of the upward-downward direction and the rightward-leftward direction. For example, the screw member 43 may not be used but only the support pin 41 may be used to restrict the amount of movement of the pin 41*b* only in the rightward-leftward direction, which is the radial direction of the pin 41*b*.

What is claimed is:

1. A projector comprising:
   a light source apparatus;
   an image generator that modulates light emitted from the light source apparatus to generate image light;
   an optical path changer that changes an optical path of the image light generated by the image generator; and
   a projection optical apparatus that projects the image light having an optical path changed by the optical path changer,
   wherein the image generator includes a light modulator that modulates the light emitted from the light source apparatus in accordance with image information to generate the image light, and a first holder that holds the light modulator,
   the optical path changer includes an optical part that the image light outputted from the image generator enters, a support frame that pivotably supports the optical part, and a second holder that holds the support frame, the projection optical apparatus includes a projection system that the light emitted from the optical path changer enters, and a third holder that holds the projection system, and
   the third holder includes
      a first positioning section that specifies a relative positional relationship between the light modulator and the projection system,
      a second positioning section that specifies a relative positional relationship between the optical part and the projection system, and
      the first and second holders are fixed to the third holder.

2. The projector according to claim 1, further comprising a light guiding optical apparatus that guides the light outputted from the light source apparatus to the image generator,
   wherein the light guiding optical apparatus includes a light guide system that guides the light outputted from the light source apparatus, and a fourth holder that holds the light guide system, and the fourth holder is fixed to the third holder.

3. The projector according to claim 2, wherein the third holder further includes a third positioning section that specifies a relative positional relationship between the light guide system and the projection system.

4. The projector according to claim 2, wherein the first holder of the image generator includes a first extending section that extends toward the third holder,
   the second holder of the optical path changer includes a second extending section that extends toward the third holder,
   the fourth holder of the light guiding optical apparatus includes a third extending section that extends toward the third holder,
   the first holder is fixed to the third holder via the first extending section,
   the second holder is fixed to the third holder via the second extending section,
   the fourth holder is fixed to the third holder via the third extending section, and
   in a plan view viewed in a first direction along an optical axis of the projection system, the first, second, and third extending sections overlap with each other.

5. The projector according to claim 4, wherein the third holder includes
   a first fixing section for fixing the first holder,
   a second fixing section for fixing the second holder, and
   a third fixing section for fixing the fourth holder, and
   the first, second, and third fixing sections are arranged in different positions with each other in the first direction.

6. The projector according to claim 5, wherein the projection system includes a plurality of lenses, and
   the first, second, and third fixing sections are located at a light exiting side of a lens located in a position closest to a light incident side out of the plurality of lenses of the projection system.

7. The projector according to claim 5, wherein the first fixing section has a first screw hole located at one side of a second direction perpendicular to the first direction with respect to the optical axis of the projection system, and a second screw hole located at another side of the second direction with respect to the optical axis of the projection system, the second fixing section has a third screw hole located at the one side of the second direction with respect to the optical axis of the projection system, and a fourth screw hole located at the other side of the second direction with respect to the optical axis of the projection system, the third fixing section has a fifth screw hole located at the one side of the second direction with respect to the optical axis of the projection system, and a sixth screw hole located at the other side of the second direction with respect to the optical axis of the projection system, the first, third, and fifth screw holes are linearly arranged along a third direction perpendicular to the first and second directions, and the second, fourth, and sixth screw holes are linearly arranged along the third direction perpendicular to the first and second directions.

8. The projector according to claim 7, wherein the second extending section includes a fixed section fixed to the second fixing section, and in the plan view viewed in the first direction, the first and second screw holes are disposed in cutouts provided in the fixed section.

9. The projector 1 according to claim 2, further comprising:

an exterior enclosure in which the light source apparatus, the image generator, the optical path changer, the projection optical apparatus, and the light guiding optical apparatus are disposed;

a base substrate that is fixed to the exterior enclosure and to which the projection optical apparatus and the light source apparatus are fixed; and a floating fixation mechanism that restricts relative movement between the base substrate and the fourth holder and fixes the base substrate and the fourth holder of the light guiding optical apparatus to each other.

10. The projector according to claim 2, wherein a mass of the projection optical apparatus is greater than a total mass of the optical path changer, the image generator, and the light guiding optical apparatus.

11. The projector according to claim 1, wherein the projection optical apparatus further includes a reflective projection mirror that reflects and projects the light emitted from the optical path changer.

12. A projector comprising:

a light source apparatus;

an image generator that modulates light emitted from the light source apparatus to generate image light;

an optical path changer that changes an optical path of the image light generated by the image generator;

a projection optical apparatus that projects the image light having an optical path changed by the optical path changer; and a light guiding optical apparatus that guides the light outputted from the light source apparatus, wherein the image generator includes a light modulator that modulates the light emitted from the light source apparatus in accordance with image information to generate the image light, and a first holder that holds the light modulator, the optical path changer includes an optical part that the image light outputted from the image generator enters, a support frame that pivotably supports the optical part, and a second holder that holds the support frame, the projection optical apparatus includes a projection system that the light emitted from the optical path changer enters, and a third holder that holds the projection system, and the third holder includes a first positioning section that specifies a relative positional relationship between the light modulator and the projection system, a second positioning section that specifies a relative positional relationship between the optical part and the projection system, and the light guiding optical apparatus includes a light guide system that the light outputted from the light source apparatus enters, and a fourth holder that holds the light guide system, and the second and fourth holders are fixed to the third holder.

13. The projector according to claim 12, wherein the first holder of the light modulator includes a first extending section that extends toward the third holder, the second holder of the optical path changer includes a second extending section that extends toward the third holder, the fourth holder of the light guiding optical apparatus includes a third extending section that extends toward the third holder, the first holder is fixed to the third holder via the first extending section, the second holder is fixed to the third holder via the second extending section, the fourth holder is fixed to the third holder via the third extending section, the third holder includes a first fixing section for fixing the first holder, a second fixing section for fixing the second holder, and a third fixing section for fixing the fourth holder, and the first, second, and third fixing sections are arranged in different positions with each other in a first direction along an optical axis of the projection system.

14. A projector comprising:

a light source apparatus;

an image generator that modulates light emitted from the light source apparatus to generate image light;

an optical path changer that changes an optical path of the image light generated by the image generator;

a projection optical apparatus that projects the image light having an optical path changed by the optical path changer; and a light guiding optical apparatus that guides the light outputted from the light source apparatus, wherein the image generator includes a light modulator that modulates the light emitted from the light source apparatus in accordance with image information to generate the image light, and a first holder that holds the light modulator, the optical path changer includes an optical part that the image light outputted from the image generator enters, a support frame that pivotably supports the optical part, and a second holder that holds the support frame, the projection optical apparatus includes a projection system that the light emitted from the optical path changer enters, and a third holder that holds the projection system, and the third holder includes a first positioning section that specifies a relative positional relationship between the light modulator and the projection system, a second positioning section that specifies a relative positional relationship between the optical part and the projection system, and the light guiding optical apparatus includes a light guide system that the light outputted from the light source apparatus enters, and a fourth holder that holds the light guide system, and the first and fourth holders are fixed to the third holder.

* * * * *